United States Patent [19]

Itoh et al.

[11] Patent Number: 4,682,845
[45] Date of Patent: Jul. 28, 1987

[54] APPARATUS FOR TRANSMITTING OPTICAL IMAGE

[75] Inventors: Yoshitoshi Itoh, Ome; Katsuhiro Mizuno, Tokyo; Atomi Noguchi, Hitachi, all of Japan

[73] Assignee: Hitachi, Ltd., Tokyo, Japan

[21] Appl. No.: 625,593

[22] Filed: Jun. 28, 1984

[30] Foreign Application Priority Data

Jun. 30, 1983 [JP] Japan ................................. 58-116978
Sep. 1, 1983 [JP] Japan ................................. 58-158950

[51] Int. Cl.⁴ ............................................. G02B 6/32
[52] U.S. Cl. .............................. 350/96.18; 350/96.10
[58] Field of Search ............... 350/96.18, 96.19, 96.25, 350/96.28

[56] References Cited

U.S. PATENT DOCUMENTS

3,449,037  3/1966  Koester .................. 350/168
4,472,797  9/1984  Nicia ..................... 350/96.19

Primary Examiner—William L. Sikes
Assistant Examiner—Akm E. Ullah
Attorney, Agent, or Firm—Antonelli, Terry & Wands

[57] ABSTRACT

In an apparatus for transmitting an optical image using an image guide which is equipped with dispersive devices, the invention has an advantage such that dispersive devices which are arranged in an objective lens system and an ocular lens system are attached by being rotated by only a constant angle in the same direction around their respective optical axes as rotational centers with respect to each of an edge surface and rear edge surface of the image guide.

5 Claims, 11 Drawing Figures

APPARATUS FOR TRANSMITTING OPTICAL IMAGE

BACKGROUND OF THE INVENTION

The present invention relates to an apparatus for transmitting an optical image whereby an image guide consisting of a number of bundled optical fibers and an optical lens system are combined and a two-dimensional image is transmitted from one location to another location. For example, the invention can be used for observation, inspection, etc. of nuclear facilities from a distant place.

Figure 1:
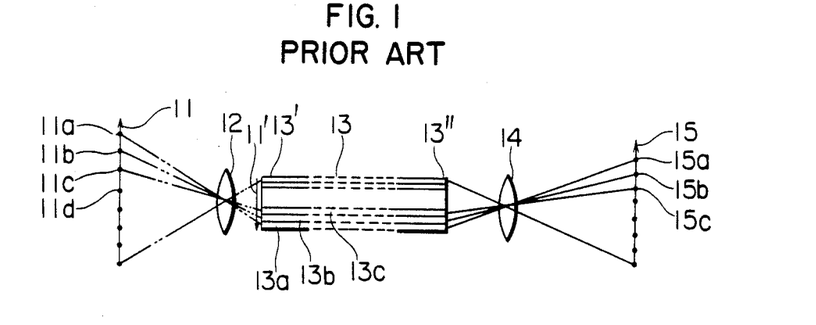
FIG. 1 shows a fundamental constitutional diagram of a conventional apparatus.

Conventional technology and its problems will be described with reference to FIGS. 1 to 6. A fundamental constitution of the optical image transmitting apparatus which is constituted by a combination of the image guide consisting of a number of bundled optical fibers and the optical lens is shown in FIG. 1 (refer to W. B. ALLAN, Fiber Optics, Theory and Practice, 1973, p. 149, FIG. 1). In this optical system, an optical image is transmitted in the manner as follows. An image 11' of an object 11 is first formed on an edge surface 13' of an image guide 13 by an objective lens 12. The image guide 13 is constituted by bundling a number of optical fibers 13a, 13b, 13c, . . . Among the light formed on the edge surface 13' of the image guide 13, the light which entered the core section of each optical fiber constituting the image guide is transmitted to a rear edge surface 13" of the image guide 13. In FIG. 1, it is illustrated that the edge surface 13' and the rear edge surface 13" of the image guide 13 are arranged rectilinearly on the same axis. However, in an actual apparatus, a length of the image guide 13 is ordinarily tens of meters and in such a case it is apparent that the image guide can be freely bent at locations intermediate the edge surfaces.

The image transmitted onto the rear edge surface 13" of the image guide 13 is constituted by the light and shading of the point corresponding to the core section of each optical fiber of the image guide 13. The image transmitted onto the rear edge surface 13" is observed as an image 15 by an ocular lens 14 on a screen disposed at the rear location. The image 15 is constituted by points 15a, 15b, 15c, . . . , and the like corresponding to the optical fibers which constitute the image guide 13. When the edge surface 13' of the image guide 13 was projected on the object 11 by the objective lens 12, the location on the object 11 represented by these respective points corresponds to the location where the core section of each optical fiber at the edge surface 13' is image-formed.

Figure 2:
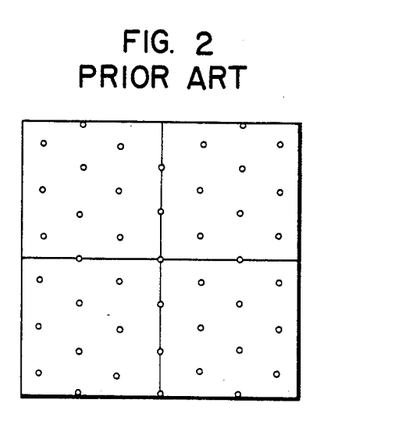
FIG. 2 is a diagram showing an example of an arrangement of the points which constitute an image transmitted by the constitution shown in FIG. 1.

However, the optical image transmitting apparatus with the conventional arrangement shown in FIG. 1 has the following problem. Namely, the image 15 obtained by the image guide optical system of FIG. 1 is represented by the light and shading of the point corresponding to the core section of each optical fiber which constitutes the image guide as shown in FIG. 2 which illustrates an example thereof. Therefore, there is a problem such that the resolution of the image is restricted by the number of optical fibers of the image guide, so that the resolution is small.

As one method of solving such a problem, a method whereby the edge surface 13' and the rear edge surface 13" of the image guide 13 are synchronously vibrated is known. However, this method has a problem such that the apparatus increases in size and its reliability is low since there is a movable section.

Figure 3:
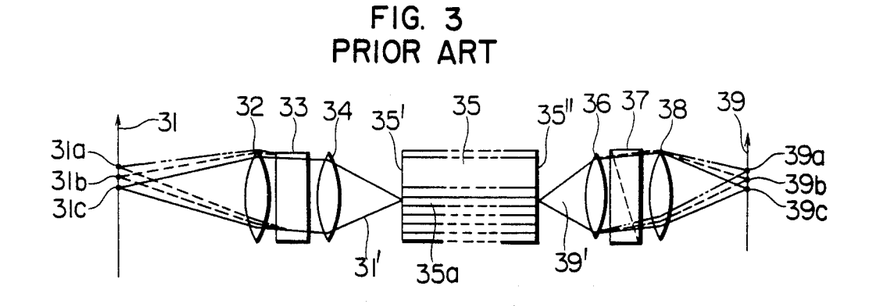
FIG. 3 shows a constitutional diagram of an apparatus equipped with dispersive devices.

As another method, a method whereby dispersive devices are arranged in the objective lens system and ocular lens system, respectively, has been proposed (Japanese Patent Application Laid-Open Publication No. 23653/71, "APPARATUS FOR TRANSMITTING OPTICAL IMAGE"). FIG. 3 shows an arrangement of the image guide optical system using the dispersive devices. In FIG. 3, a reference numeral 31 denotes an object; 32, 34 are objective lenses; and 33 a dispersive device disposed between the objective lenses 32 and 34. A numeral 35 indicates an image guide which is formed by bundling a number of optical fibers such that their edge surfaces are regularly aligned, and 35a represents one of the optical fibers. Numerals 36 and 38 are ocular lenses; 37 is a dispersive device which is disposed between the occular lenses 36 and 38 and 39 is an image on the screen which is transmitted by this optical system and is constituted by respective points 39a, 39b, 39c, . . . , etc.

In FIG. 3, the image 39 is represented by the points corresponding to the respective optical fibers which constitute the image guide 35. When an edge surface 35' of the image guide 35 was projected onto the object 31 by the objective lens system, these points represent the light at the location where the optical fiber core section of the image at that edge surface is formed.

The operation of one optical fiber 35a among the optical fibers which constitute the image guide 35 will now be discussed. First, the case where the object is illuminated by blue light is considered. In this case, the point on the object 31 to which the optical fiber 35a transmits the light can be known as a location 31a where the image corresponding to 35a is formed by forming the image of 35a onto the object 31 by the objective lens systems 32, 33 and 34. The point corresponding to 31a among the points which constitute the image 39 is 39a.

The case where the object is illuminated by the green light will now be considered. In this case as well, the point on the object 31 to which the optical fiber 35a transmits the light can be known by the similar means as mentioned above. However, in this case, since the light is green, the progressing direction of the light is slightly more bent by the dispersive device 33 than in the case of blue light, so that the image of 35a is formed at a location 31b which is slightly different from the location in the case of blue light. Therefore, in case of using green light, the point to which the light is transmitted by the optical fiber 35a is 31b. The progressing direction of the light is also bent by the dispersive device 37 even in the ocular lens system; thus, the image responsive to the point 31b on the object 31 is formed at the point 39b different from the case where the blue illumination light was used. In case of using red light as the illumination light also, the light at a point 31c on the object 31 is transmitted to the point 39c by the optical fiber 35a due to the similar reason.

Figure 4:
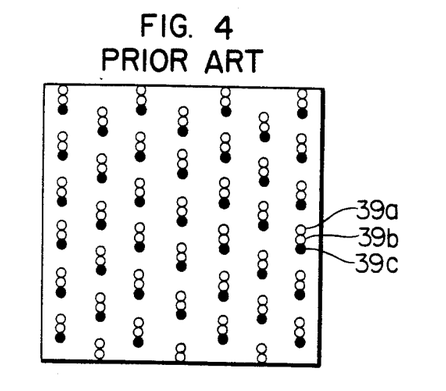
FIG. 4 shows an arrangement diagram of the points of the image transmitted by the constitution of FIG. 3.

In this way, the use of the dispersive devices enables the lights of the points at a few locations to be transmitted by one optical fiber. The similar operation also occurs with regard to each optical fiber which constitutes the image guide 35. FIG. 4 illustrates the states of the points which constitute the image 39 which is transmitted by the image guide optical system in this case. In FIG. 4, numerals 39a, 39b and 39c indicate the points to which the lights are transmitted in the case where the blue, green and red illumination lights were used, respectively.

If the white light is used as an illumination light, the points to which the light is transmitted by a single optical fiber will become continuous since the white light continuously includes blue, green, red, . . . , etc. Therefore, the image obtained is constituted by a short line instead of a set of points. In this case, it can be considered that the image at the edge surface of the optical fibers is closely arranged in the longitudinal direction of the short line; as a result, the resolution in the longitudinal direction of the short line is improved.

Figure 5:
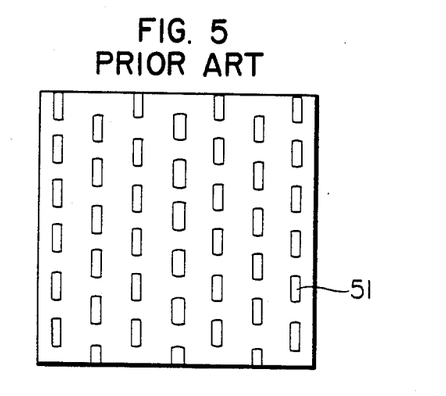
FIG. 5 is a diagram showing the state whereby the image points in FIG. 4 overlap and become the short lines.
Figure 6:
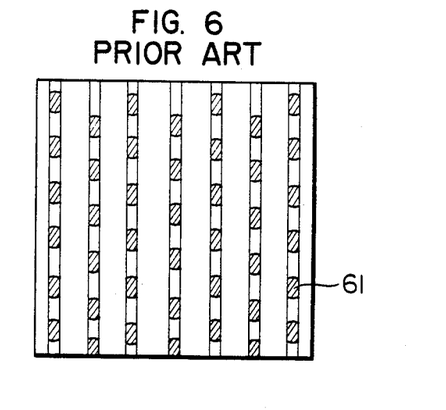
FIG. 6 is a diagram showing the state whereby the short line images in FIG. 5 overlap each other.

FIG. 5 illustrates the state of the short lines which constitute the image in such a case. In FIG. 5, a numeral 51 denotes a short line constituted by the sequential points to which the light is transmitted by a single optical fiber. As an extent of dispersion by the dispersive devices 33 and 37 increases, a length of the short line 51 becomes long, so that the short line will partially overlap with the short lines by the adjacent optical fibers. FIG. 6 shows the state in the case where the adjacent short lines partially overlapped. A numeral 61 indicates an overlapped portion. The brightness information at the overlapped portion is transmitted by two optical fibers. Therefore, even if one of the two optical fibers is burned out, the brightness information is transmitted by the other optical fiber. Consequently, the lack of brightness information at the overlapped portion due to the burn-out of the optical fiber is avoided.

As described above, use of the image guide optical system whereby the dispersive devices are arranged provides an advantage such that the resolution is improved as compared with the case where no dispersive device is used since the lights at many points are transmitted in the direction of the short line which constitutes the image. Further, in the case where the short line is elongated like a straight line with the overlapped portion, as well as the above advantage, there is also an advantage such that it is possible to prevent the lack of brightness information even if the optical fiber is burned out.

However, in the foregoing arrangement, there is a problem such that the resolution in the direction perpendicular to the direction of the short line or straight line which constitutes the image is not improved. In addition, even in the case where the short lines are continuously formed to derive the straight line with overlapped portions, a length of the portion which is not overlapped is restricted by the distance between the adjacent two optical fibers in its rectilinear direction, so that there is a problem such that it is impossible to improve the resolution any more.

SUMMARY OF THE INVENTION

It is an object of the present invention to solve the above-mentioned problems in the optical image transmitting apparatus using the image guide optical system in which the dispersive devices are arranged and to provide an apparatus for transmitting an optical image which can improve the resolution of an image having a short line form not only in one direction but also in the direction perpendicular thereto. In addition, even in the case where the short lines are continued to make the straight line with the overlapped portions, it is possible to make a length of the portion where the overlapping does not occur to an extent longer than that in the case of the conventional arrangement, thereby to further improve the resolution in the direction perpendicular to the longitudinal direction of the short line.

To accomplish the above object, according to the present invention, an apparatus for transmitting an optical image comprises: an image guide which is formed by bundling optical fibers for transmitting light; an objective lens system, arranged on the side of an edge surface of the image guide, for forming an image of an object which is observed onto the edge surface of the image guide; first dispersive device means which cooperates with the objective lens system and disperses the location of the image formed on the edge surface of the image guide in accordance with different wavelengths of light; an ocular lens system, arranged on the side of a rear edge surface of the image guide, for projecting the light transmitted through the image guide to its rear edge surface onto a screen; and second dispersive device means which cooperates with the ocular lens and disperses the light transmitted through the image guide to its rear edge surface in accordance with the different wavelengths of the light, thereby to synthesize the image on the screen. In this apparatus, the first dispersive device means is arranged by being rotated by only a constant angle with respect to the edge surface of the image guide around its optical axis as a center in the manner such that the images at the edge surfaces of the respective optical fibers which can be formed on the surface of the object observed through the objective lens system to not overlap mutually, and the second dispersive device means is arranged by being rotated by only a constant angle in the same direction of the first dispersive device means with respect to the rear edge surface of the image guide around its optical axis as a center.

BRIEF DESCRIPTION OF THE DRAWINGS

The present invention will be apparent from the following detailed description taken in conjunction with the accompanying drawings, in which.

DESCRIPTION OF THE PREFERRED EMBODIMENTS

Figure 7:
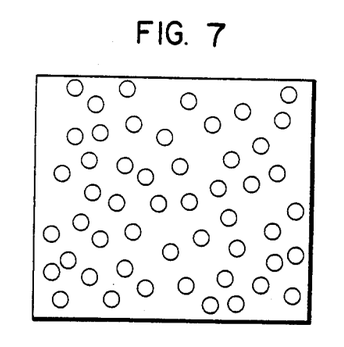
FIG. 7 is a diagram showing an example of an irregular arrangement according to the present invention.
Figure 8:
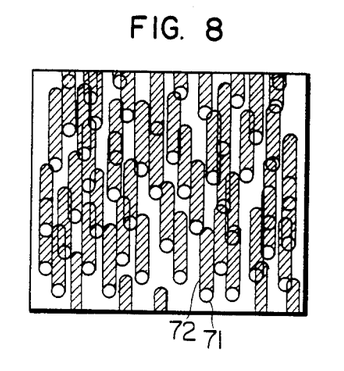
FIG. 8 is a diagram showing the state of the short line images regarding the arrangement of FIG. 7.

An embodiment of the present invention will now be described hereinbelow with reference to the drawings. In this invention, an image guide having an irregular arrangement as shown in FIG. 7 is used in the case where the arrangement of the optical fibers which constitute the image guide 35 in FIG. 3 is seen in its edge surfaces. As apparent, the image guide is formed by irregularly bundling the optical fibers such that its arrangement as seen in cross section perpendicular to the longitudinal direction of the optical fibers as represented by the edge surface of FIG. 7 does not have a constant periodic pattern in any direction in the cross section. It is possible to obtain the locations on the object 31 to which the lights are transmitted by the optical system using such an image guide by the above-described method. Those locations are as illustrated in FIG. 8 In this case also, the image guide optical system is constituted by a short line 72 as shown in FIG. 8. A reference numeral 71 denotes an image at the core section of the optical fiber which was projected on the object 31 using the light having the shortest wavelength in the illumination light, namely, a location corresponding to the optical fiber arrangement shown in FIG. 7.

In FIG. 8, since the short line 72 is directed vertically, the image is formed by a great number of light and shading points vertically, so that the resolution becomes very large. This point is the same as in the conventional technology.

Next, the horizontal resolution in FIG. 8, will be discussed. In FIG. 8, a horizontal rectilinear image is now considered and the examination is made to know by how many points per unit length is the rectilinear image represented. This number of points is equal to the number of short lines which come into contact with or cross the straight line of a unit length in the horizontal direction. In the case where the optical fibers are regularly arranged, the number of short lines which cross the horizontal straight line is small since the short lines overlap each other as shown in FIG. 6. However, in the present invention, the overlapping of the short lines is reduced by adopting the irregular arrangement of the optical fibers, thereby increasing the number of short lines which cross the horizontal straight line. Assuming that a length of one short line is $\Delta D$, the number N per unit length of short lines which cross the horizontal straight line can be obtained as the number of optical fiber images 71 which are included in the area of $\Delta D \times 1$ in FIG. 8.

In FIG. 3, it is assumed that a focal point of the objective lens 32 is $f_1$, a focal length of the objective line 34 is $f_2$, a focal length of the ocular lens 36 is $f_2'$, a focal length of the ocular lens 38 is $f_1'$, a value of dispersion $\partial\theta/\partial\lambda$ of each of the dispersive devices 33 and 37 is $a$, and further a wavelength width of illumination light is $\Delta\lambda$.

A length $\Delta D$ of the short line 72 is represented by $$\Delta D = a \cdot \Delta\lambda \cdot f_1$$

using these values. Assuming that a density of the image 72 at the optical fiber edge surface projected onto the object 31 is $D_e$, the number N per unit length of short lines which cross the horizontal straight line in FIG. 8 will be $$N = D_e \cdot \Delta D + \frac{1}{d_1} \cdot \frac{f_2}{f_1}$$

$$= D_e \cdot a \cdot \Delta\lambda \cdot f_1 + \frac{1}{d_1} \cdot \frac{f_2}{f_1}$$

where, $d_1$ is a diameter of the cladding of the optical fiber and $(1/d_1) \cdot (f_2/f_1)$ is an average number of the edge surface images which exist on the horizontal line of a unit length.

Although there is a difference in constructional arrangement of the optical fibers between the image guide in which the optical fibers are densely bundled and the image guide in which they are irregularly bundled, their densities of the optical fibers are almost equal. If a value of a density $D_i$ of the optical fibers of the image guide with the dense configuration is used as a density of optical fibers of the image guide with the irregular arrangement, $D_i$ will be represented by $$D_i = \frac{2}{\sqrt{3} \, d_1^2}$$

using the clad diameter $d_1$ of the optical fibers. Since a magnification factor by the objective lens is $f_1/f_2$, the density $D_e$ of the images at the edge surface of the optical fibers projected on the object 31 is $$D_e = \frac{D_i}{M^2} = \frac{2}{\sqrt{3} \, d_1^2} \cdot \left(\frac{f_2}{f_1}\right)^2$$

Therefore, N will be represented by $$N = \frac{2}{\sqrt{3} \, d_1^2} \cdot \left(\frac{f_2}{f_1}\right)^2 \cdot f_2 \cdot a \cdot \Delta\lambda + \frac{1}{d_1} \cdot \frac{f_2}{f_1}$$

From this result, it will be understood that the line of a unit length in the horizontal direction is represented by N points in the transmission image in FIG. 8. Although the distances among these N points are irregular, they are 1/N on the average. Therefore, the resolution l in the horizontal direction can be represented by $$l = \frac{1}{2 \cdot \frac{1}{N}} = \frac{N}{2} = \left\{ \frac{1}{2d_1} + \frac{f_2 \cdot \Delta\lambda \cdot a}{\sqrt{3} \, d_1^2} \right\} \frac{f_2}{f_1}$$

However, the value obtained by the above expression is the value in the case where the overlapping of the respective short lines hardly occur since a core diameter of the optical fiber is very small. Assuming that a core diameter of the optical fiber is $d_0$, a diameter of the image at the edge surface of the core section which was formed on the object using a monochromatic light by the objective lens will be $$d_0 \cdot M = d_0 \cdot (f_1/f_2)$$

In the case where the images of the core section having such a diameter are sequentially arranged so as to come into contact with each other, the number per unit length of points will be $(1/d_0) \cdot (f_2/f_1)$, so that the maximum resolution $l_{max}$ which can be represented by a series of points (small circles) of such a number will be $$l_{max} = (1/2d_0) \cdot (f_2/f_1)$$

A value of the resolution l obtained due to realization of high resolution may be a value larger than $l_{max}$ in the calculation expression. However in this case, each short line overlaps, so that the resolution l decreases to a value below $l_{max}$. Actually, the overlapping of each short line does not suddenly occur when l becomes larger than $l_{max}$, but it can be considered such that the overlapping gradually occurs with an increase in the value of l and that its rate increases as l approaches $l_{max}$. A change in its rate depends upon the irregularity of the arrangement of the optical fibers.

In this way, although a rate of the overlapping of the short lines increases as a length ΔD of short line becomes longer, this overlapping does not weaken the effect of realizing the high resolution but is the phenomenon caused because the resolution derived due to realization of high resolution approaches the maximum value which is determined by the core diameter.

In the case where the short lines overlapped, the overlapped portions do not contribute to the realization of high resolution; however, in place of this, it provides an effect of compensating the burn-out of the optical fibers. Due to this, even if the resolution obtained due to the realization of high resolution is saturated and the overlapping of the short lines occurs, no trouble will be actually caused.

Practical examples will now be mentioned hereinbelow.

EXAMPLE 1

An arrangement of the optical system in this Example is the same as the optical system shown in FIG. 3. The image guide 35 used is formed by bundling thirty thousand optical fibers having a cladding diameter of 20 μm and a core diameter of 8 μm in accordance with an irregular arrangement. The focal length $f_1$ of the lens 34 of the objective lens system is 10 mm. The distance between the lens 34 and the edge surface 35' of the image guide 35 is 10 mm. The focal length $f_2$ of the lens 32 of the objective lens system is 50 mm. A direct vision prism is used as the dispersive device 33. This prism has characteristics such that when white light enters as a parallel light beam, there is a difference in exit angle of 0.71° between the light having a wavelength of 0.7 μm and the light of 0.4 μm among the wavelengths of light which trasmit through the prism. The lens 32 and the dispersive device 33 are disposed near the lens 34 as close as possible. The focal length $f_1'$ of the lens 36 of the ocular lens system is 10 mm. As the dispersive device 37, the direct vision prism having the same characteristic as the device 33 is used. The focal length $f_2'$ of the lens 38 is 10 mm. The lens 36 is disposed at the location which is 10 mm apart from the rear edge surface 35'' of the image guide 35. The dispersive device 37 and the lens 38 are disposed near the lens 36.

The transmission of an image by the optical system with such a constitution will now be considered. When the edge surface 35' of the image guide 35 is projected onto the object by the objective lens system, it becomes as shown in FIG. 8 and the image at the edge surface of single optical fiber becomes elongated as indicated at 72. For example, when considering the location on the object corresponding to 72, the reflected light of the light having a wavelength of 0.7 μm from one location corresponding to one of both sides of 72 and the reflected light of the light of a wavelength of 0.4 μm from the other location are focused to the edge surface of one optical fiber in the image guide by the objective lens system. The light entering the optical fiber is transmitted to the rear edge surface 35'' without substantial loss. The light emitted from the rear edge surface 35'' progresses to the planes of incidence of the lens 36 and dispersive device 37 without any change. However, the progressing direction of the light is bent by the dispersive device 37 by only an angle corresponding to the wavelength of light, so that there is a difference in angle of only 0.71° between the progressing directions of light having wavelengths of 0.71 μm and 0.4 μm. The light transmitted through the dispersive device 37 is formed at a point on the image surface by the lens 38. At this time, since the incident directions into the lens 38 differ depending upon the wavelengths of the light, the points of the images formed on the image surface are located at different positions in dependence upon the wavelengths of the light and its distance is 0.62 mm/5=0.124 mm. Although light having wavelengths of 0.4 μm and 0.7 μm have been described above, the light having an intermediate wavelength transmits the brightness information at the intermediate portion of 72 onto the image surface in accordance with a value of the wavelength.

In this way, the brightness information is transmitted by the respective optical fibers which constitute the image guide, so that an image is transmitted. In case of this Example, although the distance between both ends of the short line 72 transmitted by one optical fiber is 1/5 on the image surface, the distances among the respective optical fibers also become 1/5 on the image surface; therefore, a size of the image is 1/5 of the size of the object.

When the resolution of the image transmitted is represented using dimensions on the object surface, it will be 13.9 lp/mm [lp: line pair] from the foregoing expression in the direction perpendicular to the longitudinal direction of 72. On the other hand, since a core diameter of the optical fiber is 8 μm, the maximum value $l_{max}$ of the resolution is restricted to 12.5 lp/mm. Thus, in this case, the overlapping of the short line occurs and the resolution deteriorates to approx. 12.5 lp/mm. Since it is 5 lp/mm in case of using no dispersive device, the resolution is improved by about 2.5 times in the direction perpendicular to the longitudinal direction of 72. The resolution in the longitudinal direction of 72 becomes equal to that in the case where the cores of optical fibers are closely arranged, so that the resolution is improved by about 2.5 times. As described above, according to this Example, the resolutions in the two directions of the image guide are improved.

EXAMPLE 2

The optical system in this Example is similarly constituted as the optical system in Example 1 except that the lens 32 on the object side of the objective lens system is removed. In the optical system in Example 1, the lens 32 on the object side of the object lens system functions to convert the light from the points on the object to a parallel light beam for transmission through the dispersive prism. This lens was needed in the case where the object and the objective lens system are closely disposed. However, in the case where there is a large distance between the object and the objective lens system, light which enters the objective lens system from the object can be regarded as substantially parallel light flux, and the lens on the object side of the objective lens system is accordingly unnecessary.

This Example relates to the case where the apparatus is provided with an image guide optical system to observe an object under the conditions whereby there is a large distance between the object and the objective lens system and light which directly enters the dispersive prism from the object can be regarded as substantially parallel light flux. The operations which this optical system affects the flux of incident light are identical to those in Example 1 on the post side which includes the dispersive prism of the object lens.

Although a magnification factor M of the objective lens systme was set into $f_1/f_2$ in the calculation expression to obtain the resolution, in this case, a magnification factor by a single lens on the image guide side of the objective lens system may be used in place of $f_1/f_2$. In practice, assuming that a distance between the object and the objective lens system is S, the magnification factor M will be almost $S/f_2$. Therefore, assuming that a distance between the objective lens and the object is 1000 mm, the resolution of this image guide optical system will be 0.695 fibers/mm. Since the resolution in the case where high resolution is not realized is 0.25 fibers/mm, the resolution is improved by approx. 2.5 times.

In the above Examples, the case where the direct vision prism is used as the dispersive device has been described. However, it is apparent that the present invention can be embodied using a diffraction grating. Further, even in the case where a range of wavelength of the light was set into a value which is wider than the foregoing range of 0.4 μm to 0.7 μm, a similar effect is obtained.

According to the above-described embodiment, the optical system is relatively easily constructed; therefore, the attainment of high resolution of the apparatus can be easily realized and its reliability is also high. However, the following embodiment is suitable to further improve the resolution.

Another embodiment of the present invention will be described hereinbelow with reference to the drawings.

Figure 9:
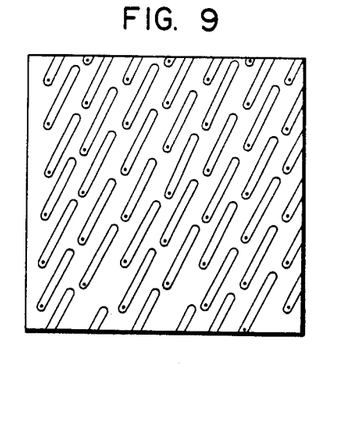
FIG. 9 shows an arrangement diagram of an image according to another embodiment of the present invention which is obtained by obliquely projecting the short line image of FIG. 6.
Figure 10:
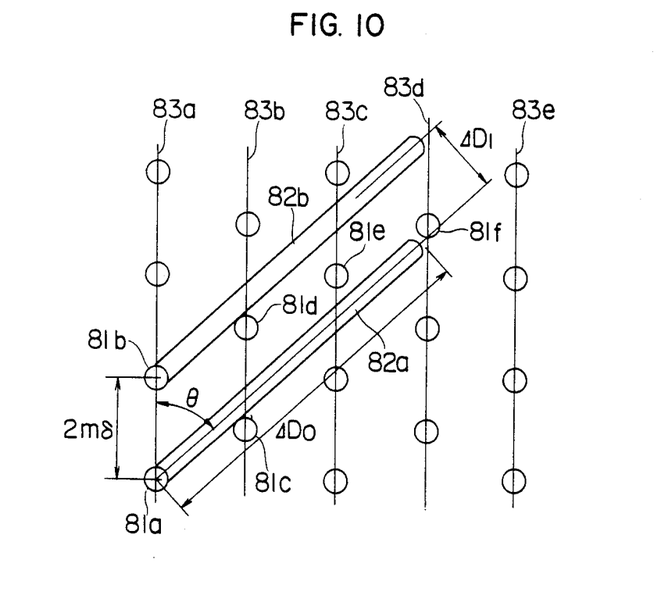
FIG. 10 illustrates a partially enlarged diagram of FIG. 9.

The case will be now described whereby the two dispersive devices 33 and 37 in the image guide optical system shown in FIG. 3 are rotated by the same angle θ in the same direction around the optical axes in the respective optical systems as rotational centers with respect to each of the edge surface 35' and rear edge surface 35" of the image guide. The image in this case is constituted by obliquely extending short lines as shown in FIG. 9. In this case, a magnitude of the rotational angle of the dispersive device is identical to the rotational angle of the short line. FIG. 10 shows a partially enlarged diagram of FIG. 9.

In FIG. 10, numerals 81a, 81b, 81c, and 81d have a constructional arrangement which is similar to the arrangement of the optical fibers at the edge surface of the image guide used. In this example shown, the optical fibers which constitute the image guide are densely arranged as described before. In other words, 81a, 81b and 81c are arranged at the locations corresponding to each vertex of a regular triangle, while 81b, 81c and 81d are also arranged at the locations corresponding to each vertex of a regular triangle. Numerals 82a and 82b denote respective short lines which are formed by the optical fibers corresponding to 81a and 81b and by a number of sequential points to which the lights are transmitted by the lights including a number of wavelengths. Each length $\Delta D_O$ of 82a and 82b represents a length of a short line by the points to which the lights are transmitted by the light which lies within a range of visible radiation. A numeral 83a denotes a plane which includes 81a and 81b, and 83b indicates a plane which includes 81c and 81d.

When it is assumed that a magnification factor when the image at the edge surface of the image guide was formed on the object 31 by the objective lens system is m and distances among the respective optical fibers which are also densely arranged are 2δ, on the image surfaces of FIGS. 9 and 10, a distance between 81a and 81b, a distance between 81a and 81c, a distance between 81b and 81c, . . . , are respectively 2 mδ, and a distance between the planes 83a and 83b is equal to a length of perpendicular from the vertex of the regular triangle to its base, so that it is $\sqrt{3}$ mδ. An angle between the short line 82a and the plane 83a is equal to the rotational angle θ of the dispersive device and this angle θ can be varied by rotating the dispersive device.

A distance $\Delta D_1$ between the short lines 82a and 82b is $$\Delta D_1 = 2\ m\delta \cdot \sin\theta.$$

When lengths of short lines 82a and 82b are as shown in FIG. 10, the optical fibers corresponding to 81d and 81e exist between the two short lines 82a and 82b, and the short lines by the respective optical fibers exist between 82a and 82b. Although it is two in FIG. 10, its number P will be generally $$P \simeq \Delta D_0 \cdot \sin\theta / \sqrt{3}\ m\delta$$

since the distances among the respective planes 83a, 83b, 38c, 83d, . . . are all $\sqrt{3}$ mδ.

Therefore, a distance $\Delta D_2$ between the adjacent short lines in the direction perpendicular to the longitudinal direction of the short line 82a will be $$\Delta D_2 = \frac{\Delta D_1}{P} = \frac{2m\delta \cdot \sin\theta}{\frac{\Delta D_0 \cdot \sin\theta}{\sqrt{3}\ m\delta}} = \frac{2\sqrt{3}\ m^2\delta^2}{\Delta D_0}$$

From a value of $\Delta D_2$, a resolution $f_{s\perp}$ in the direction perpendicular to the short line 82a will be $$f_{s\perp} = \frac{1}{2\Delta D_2} = \frac{\Delta D_0}{4\sqrt{3}\ m^2\delta^2}$$

Although a value of $f_{s\perp}$ increases in proportion to a value of length $\Delta D_0$ of the short line, it is $1/(2\sqrt{3}\ m\delta)$ when $\Delta D_0$ is 2 mδ. This value is equal to the value of resolution $f_{sO}$ in case of using no dispersive device. When a length of $\Delta D_0$ is longer than 2 mδ, the resolution $f_{s\perp}$ is larger than $f_{sO}$, so that it is improved as compared with the case of using no dispersive device. For example, when $\Delta D_O$ is larger than 23 mδ (distance between 81a and 81d in FIG. 10), $f_{s\perp}$ is more than $1/(2\ m\delta)$. This value is three or more times larger than that in the case where no dispersive device is used, so that it will be appreciated that the resolution is obviously improved.

As described above, by setting a value of length $\Delta D_0$ of short line to be larger than 2 mδ and by rotating the dispersive devices so that the overlapping of the short lines due to the respective optical fibers does not occur, the resolution can be improved regarding the two directions of the longitudinal direction of the short line and the direction perpendicular thereto.

However, as the length $\Delta D_0$ of short line becomes longer, it becomes difficult to constitute the image guide such that the overlapping with the short lines of other optical fibers does not occur, and the short line will have eventually overlapped with the short lines of other optical fibers at some places. In such a case, the overlapped portions with the short lines of other optical fibers do not contribute to improvement of resolution, so that the resolution becomes equal to that in the case where the length of $\Delta D_0$ is shorter by only the length of the overlapped portions.

Even in the case where the short lines of optical fibers overlap with the short lines of other optical fibers, if the image guide is constituted such that the length $\Delta D_0$ of short line is longer than $2\sqrt{3}\, m\delta$ and that the overlapping with the short lines by at least the adjacent optical fibers does not occur, the resolutions regarding two directions of the longitudinal direction of the short line and the direction perpendicular thereto will be improved by $\sqrt{3}$ times or more as compared with that in the case of using no dispersive device.

Practical Examples will now be described hereinbelow.

EXAMPLE 3

The optical system of this Example is constituted in the same manner as the optical system shown in FIG. 3. The image guide 35 used is formed by densely bundling thirty thousand optical fibers each having a diameter of 20 µm. The focal length $f_1$ of the lens 34 of the objective lens system is 10 mm. The distance between the lens 34 and the edge surface 35' of the image guide 35 is 10 mm. The focal length $f_2$ of the lens 32 of the objective lens system is 50 mm. A direct vision prism is used as the dispersive device 33. This prism has characteristics such that when white light enters as parallel light flux, there is a difference in exit angle of 0.71° between the light having a wavelength of 0.7 µm and the light of 0.4 µm among the light which transmit through the prisms. The lens 32 and the dispersive device 33 are disposed near the lens 34 as close as possible. The focal length $f_1'$ of the lens 36 of the ocular lens system is 10 mm. A direct vision prism is used as the dispersive device 37 and this prism has the same characteristic as the prism 33. The focal length $f_2'$ of the lens 38 is 10 mm. The lens 36 is disposed at the location which is 10 mm apart from the rear edge surface 35" of the image guide 35 and the dispersive device 37 and the lens 38 are disposed near the lens 36.

Next, the setting of the rotational angle $\theta$ of the dispersive devices 33 and 37 will be explained. The image at the edge surface of the image guide is projected by the objective lens system onto the object surface disposed at the location which is 50 mm apart ahead from the lens 32. The image at the edge surface of the image guide on the object surface is as illustrated in FIG. 10 (however, the angle $\theta$ is still zero in this state). A magnification factor by the objective lens is five times and the distances among the optical fibers are 20 µm; thus, the distance $2m\delta$ between the images at the edge surface of the optical fibers in FIG. 10 will be 0.1 mm. In addition, since there is a difference in refractive angle of 0.71° between the light having wavelengths of 0.4 µm and 0.7 µm by the dispersive device 33 and the focal length $f_2$ of the lens 32 is 50 mm, the length $\Delta D_0$ of short line by one optical fiber becomes $50 \times 2 \times \tan(0.75/2) = 0.62$ mm. Now, the angle $\theta$ in FIG. 10 is set into $\tan^{-1}(0.1/0.62) = 9.2°$ and the dispersive device 33 is rotated around its optical axis as a rotational center by only an angle $\theta(=9.2°)$ with respect to the edge surface 35' of the image guide 35. When $\theta$ is 9.2°, the overlapping of the short lines by the respective optical fibers does not occur. At the same time, the dispersive device 37 is also rotated around the optical axis of the ocular lens system as a rotational center by only the same angle $\theta$ in the same direction with regard to the rear edge surface 35" of the image guide 35.

The transmission of an image by the optical system with such a constitution will then be discussed. When the edge surface 35' of the image guide 35 is projected onto the object of the objective lens system, its image is as illustrated in FIG. 10. The image at the edge surface of one optical fiber becomes elongated as indicated at 82a and 82b. For instance, when the location on the object corresponding to 82a is considered, the reflected light of the light having a wavelength of 0.7 µm from one location corresponding to one of both ends of 82a and the reflected light of the light of a wavelength of 0.4 µm from the other location are focused to the edge surface of one optical fiber in the image guide by the objective lens system. The different wavelengths of light entering the optical fibers are transmitted to the rear edge surface 35" without substantial loss. The light emitted from the rear edge surface 35" progress to the incident surfaces of the lens 36 and dispersive device 37 without substantially changing. However, the progressing directions of the different wavelengths of light are bent by the dispersive device 37 by only the angles corresponding to wavelengths of the light, so that there is a difference in angle of only 0.71° between the progressing directions of the light having wavelengths of 0.71 µm and 0.4 µm. The light transmitted through the dispersive device 37 are formed at the points on the image surface by the lens 38. At this time, since the incident directions to the lens 38 differ depending upon the wavelengths of the light, the points of images formed in the image surface are formed at the locations which differ in dependence upon the wavelengths. Its distance becomes 0.62 mm/5 = 0.124 mm. Although the light having wavelengths of 0.4 µm and 0.7 µm have been discussed in the above descriptions, the light having an intermediate wavelength transmits the brightness information at the intermediate portion of 82a onto the image surface in accordance with a value of its wavelength.

As described above, the brightness information is transmitted by the respective optical fibers which constitute the image guide, so that the image is transmitted. In case of this embodiment, the distance between both ends of the short line 82a transmitted by one optical fiber is 1/5 on the image surface. However, the distances among the respective optical fibers become 1/5 on the image surfaces and a size of image is 1/5 of the object.

When the resolution of the image transmitted is represented using dimensions on the object surface, it will be 31.3 lp/mm [lp: line pair] from the above expression in the direction perpendicular to the longitudinal direction of 82a, namely, in the direction of $\theta = 9.2 + 90 = 99.2°$. In case of using no dispersive device, it is 5 lp/mm, so that the resolution is improved by approximately six times in the direction perpendicular to the longitudinal direction of 82a. With respect to the longitudinal direction of 82a, the resolution is equal to that in the case where the cores of optical fibers are densely arranged, and the practical resolution depends upon a diameter of core. However, it is remarkably improved as compared with the case where no dispersive device is used. As explained above, according to this Example, the resolutions in the two directions of the image guide are improved.

Example 4

Figure 11:
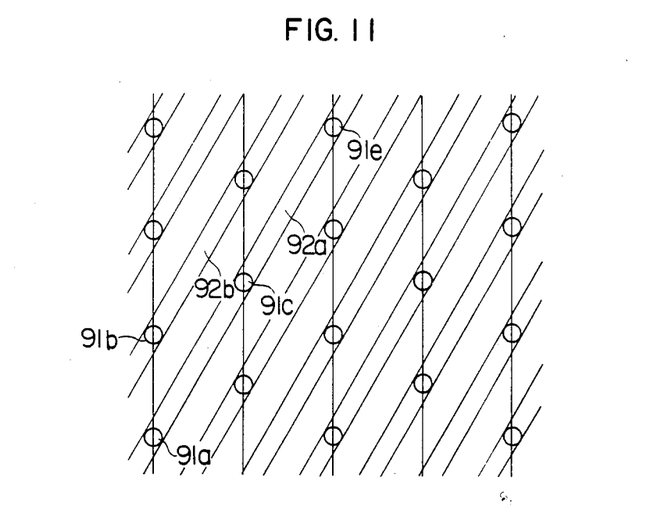
FIG. 11 shows an arrangement diagram of the short line image by another example according to the present invention.

The constitution of the optical system and the specifications of the respective components of this Example are substantially identical to those in Example 3, except that the rotational angle $\theta$ of the dispersive devices is set at 30°. In this case also, the optical fibers of the image guide are densely bundled. As already explained in conjunction with FIG. 10, in this dense configuration, 81a, 81b and 81c correspond to each vertex of a regular triangle and 81b, 81c and 81d also correspond to each vertex of a regular triangle. As a result, the projection image at the edge surface 35′ of the image guide by the objective lens when the rotational angle $\theta$ of the dispersive devices is 30° will be as shown in FIG. 11.

As mentioned before, the distances among the images at the edge surfaces of the respective optical fibers are 0.1 mm and the lengthof a short line is 0.62 mm. Consequently, when $\theta$ is 30°, a part of a short line by each optical fiber overlaps with the short lines by other optical fibers. For example, a short line 92a by 91a in FIG. 11 overlaps with the short lines by optical fibers indicated at 91c and 91e, etc. Since the overlapped portions with other short lines do not contribute to improvement of resolution, when considering the resolution, it may be assumed that the short line became shorter by only the lengths of the overlapped portions. In case of 91a, a length of the portion where the overlapping does not occur becomes $\sqrt{3} \times 0.1 = 0.173$ mm. Thus, the resolution in the direction perpendicular to the short line becomes $0.173/(\sqrt{3} \times 0.01) = 10$ lp/mm and is twice than in case of using no dispersive device.

In the foregoing Examples, the case where the direct vision prism is used as the dispersive device has been described; however, the present invention can be also apparently embodied using a diffraction grating. In addition, even in the case where a range of wavelengths of light is further set into a value which is wider than a range of 0.4 $\mu$m to 0.7 $\mu$m, a similar effect is obtained.

As described above, according to the present invention, in the optical image transmitting apparatus using an image guide optical system which is equipped with dispersive devices, the resolutions in the two directions which perpendicularly cross one another can be improved. Therefore, in the case where the necessary resolution is constant, the number of optical fibers of the image guide can be reduced, so that the image guide can be thinly formed and its flexibility is improved and mechanical advantage increases. Further, as compared with the image guide having more number of optical fibers, there are advantages such that its manufacturing becomes easy and its cost also becomes cheap, and the like.

We claim:

1. An apparatus for transmitting an optical image comprising:
   an image guide means which is formed by bundling optical fibers and transmits lights;
   an objective lens system, arranged on the side of an edge surface of said image guide means, for forming an image of an object which is observed onto said edge surface of said image guide means;
   first dispersive device means which cooperates with said objective lens system and disperses a location of the image formed on said image guide edge surface in accordance with wavelengths of lights, said first dispersive device means being arranged by being rotated by a constant angle with respect to the edge surface of said image guide means around an optical axis of said objective lens system as a center in the manner such that images at end surfaces of the respective optical fibers which form said image guide means do not overlap mutually, said images being able to be formed on the surface of the object observed through said objective lens system;
   an ocular lens system, arranged on the side of a rear edge surface of said image guide means, for projecting the lights which are transmitted onto said rear edge surface through said image guide means onto a screen; and
   second dispersive device means which are transmitted through said image guide means onto the rear edge surface thereof in accordance with wavelengths, thereby synthesizing the image on the screen, said second dispersive device means being arranged by being rotated by a constant angle in the same direction as said first dispersive device means with regard to the rear edge surface of said image guide means around an optical axis of said ocular lens system as a center.

2. An apparatus according to claim 1, wherein said image guide means is constituted by bundling the optical fibers to form a dense configuration.

3. An apparatus according to claim 1, wherein said first and second dispersive device means consist of direct vision prisms.

4. An apparatus according to claim 1, wherein said first and second dispersive device means consist of diffraction gratings.

5. An apparatus according to claim 1, wherein said first dispersive device means and said second dispersive device means are rotated by the same constant angle in the same direction.

* * * * *